United States Patent [19]
Haven

[11] 3,750,815
[45] Aug. 7, 1973

[54] CONVEYOR SYSTEM LIFT ASSEMBLY
[75] Inventor: Robert Lee Haven, New Britain, Conn.
[73] Assignee: The Stanley Works, New Britain, Conn.
[22] Filed: Dec. 3, 1971
[21] Appl. No.: 204,455

[52] U.S. Cl. ............................... 214/730, 214/1 Q
[51] Int. Cl. ............................................. B65g 7/00
[58] Field of Search.................... 214/1 Q, 6 H, 730

[56] References Cited
UNITED STATES PATENTS
| | | | |
|---|---|---|---|
| 2,551,278 | 5/1951 | Millan | 214/730 X |
| 957,015 | 5/1910 | Updegraff | 214/730 |
| 3,232,448 | 2/1966 | Browne et al. | 214/1 Q |
| 3,485,388 | 12/1969 | Bohne | 214/1 Q |
| 3,045,802 | 7/1962 | Miller, Jr. | 214/6 P X |

Primary Examiner—Gerald M. Forlenza
Assistant Examiner—Frank E. Werner
Attorney—John M. Prutzman, R. William Reinsmith et al.

[57] ABSTRACT

An article handling apparatus usable with a conveyor including a lift and a drive which has a single fluid actuated motor to reciprocate the lift, between a rest position in line with the conveyor and an elevated position. The drive includes a disengageable one-way rotary operator which rotates the lift a predetermined angular amount upon its being raised and lowered between an intermediate elevated positon and its extended position.

14 Claims, 4 Drawing Figures

PATENTED AUG 7 1973
3,750,815
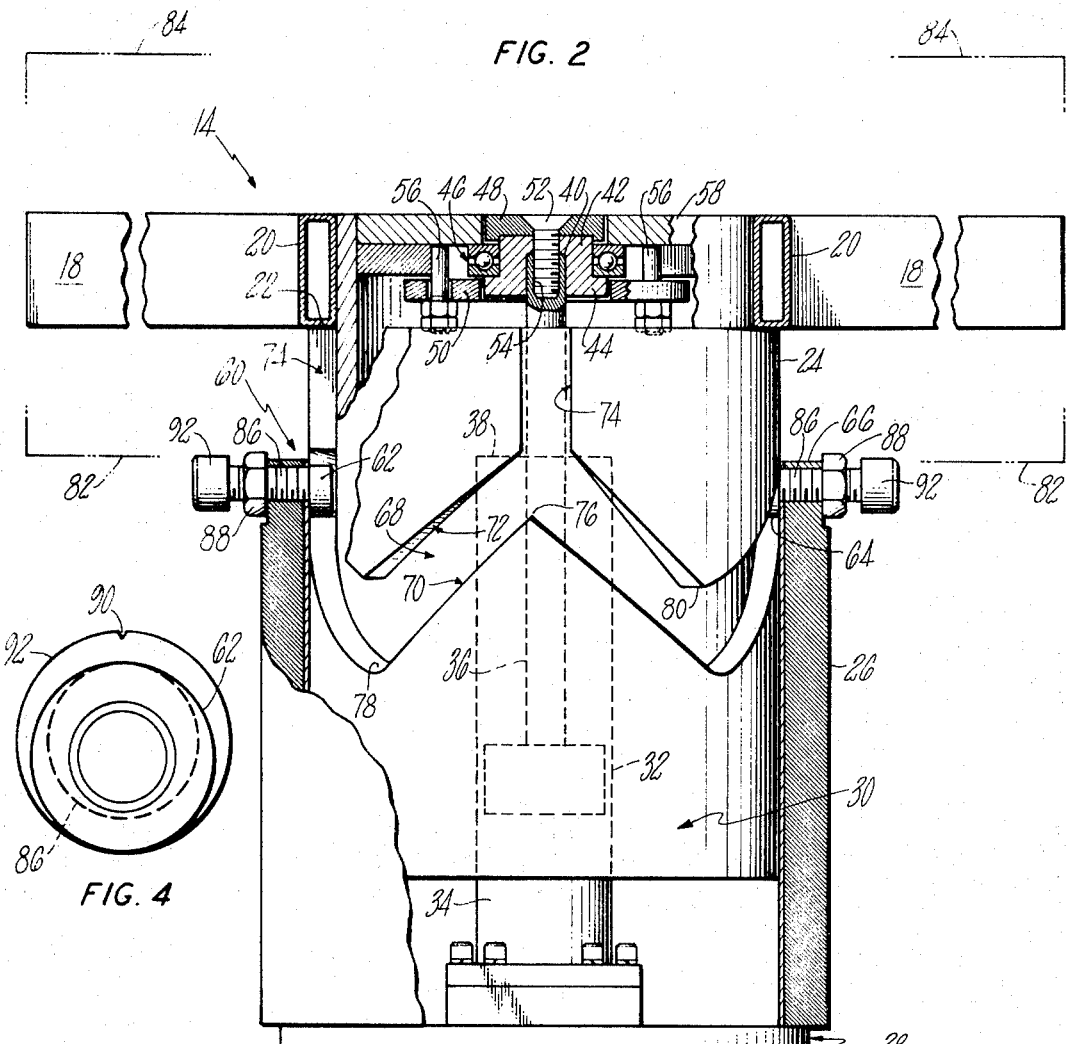
FIG. 2
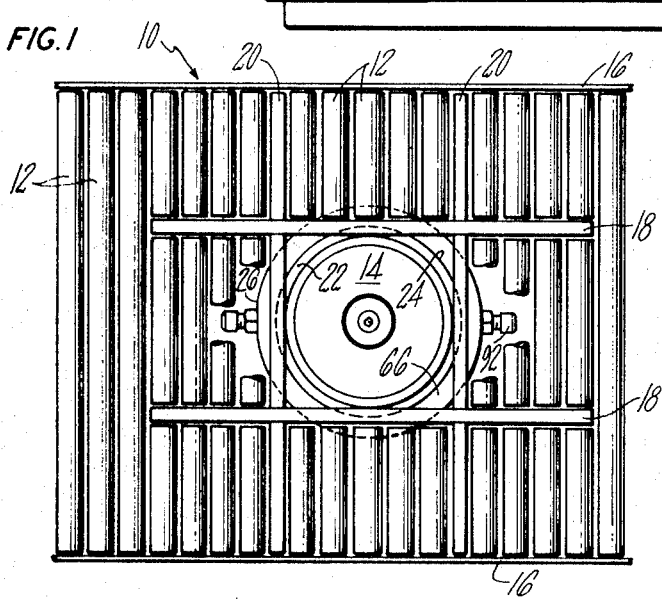
FIG. 1
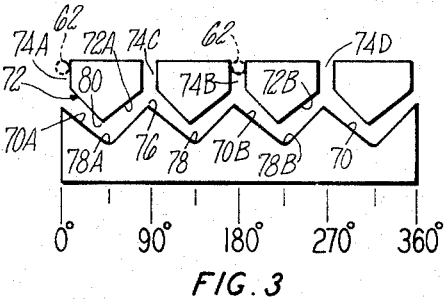
FIG. 3
FIG. 4
INVENTOR
ROBERT LEE HAVEN
BY R. William Reinsmith
ATTORNEY

CONVEYOR SYSTEM LIFT ASSEMBLY

FIELD OF THE INVENTION

This invention generally relates to article handling apparatus and particularly concerns apparatus for changing the angular position of an article on a conveyor line.

BACKGROUND OF THE INVENTION

When articles such as packages pass along a conveyor, it is frequently desirable or necessary to change the angular position of the packages at a particular point along their path of travel. In certain conveyor systems, it is desired to transfer packages from one conveyor to another conveyor. A particular need for package rotation also occurs in conjunction with strapping machines for cross-strapping a package on all sides, as well as for lifting the strapped package at a strapping station along a conveyor and reorienting the package for discharge, e.g., from the conveyor. Known apparatus conventionally apply combination translatory lifting and rotary movements to an article supporting platform by a plurality of motors and normally employ various detents, stops and similar devices on supporting structure for controlling the movements of such a platform.

OBJECTS OF THE INVENTION

Accordingly a primary object of this invention is to provide an improved conveyor system lift assembly of a compact rugged construction having a minimum number of operating parts and incorporating a single motor to effect a desired elevating movement of a lift platform and a specific angular displacement to reorient an article supported on the platform relative to a path of movement of the article along a conveyor.

Another object of this invention is to provide an improved lift assembly of the type described utilizing a barrel type cam arrangement to effect controlled rotation of the lift platform in an elevated position relative to a conveyor.

A further object of this invention is to provide such an improved lift assembly which may be quickly and easily installed in new or existing conveyor systems for dependable service usage over an extended period of time with minimum maintenance requirements.

Other objects will be in part obvious and in part pointed out in more detail hereinafter.

A better understanding of the objects, advantages, features, properties and relationships of the invention will be obtained from the following detailed description and accompanying drawing which sets forth an illustrative embodiment and is indicative of the way in which the principle of the invention is employed.

BRIEF DESCRIPTION OF THE DRAWING

In the drawing:

FIG. 1 is a fragmentary plan view, partly broken away, showing a portion of a conveyor system and lift assembly incorporating this invention;

FIG. 2 is an enlarged side elevation view, partly broken away and partly in section, of the lift assembly;

FIG. 3 is a schematic layout, on a reduced scale, showing a cam track in relation to a cylinder wall of the lift assembly on which the cam track is formed; and FIG. 4 is an enlarged end view of an eccentrically mounted cam follower roller employed in the lift assembly.

DETAILED DESCRIPTION OF THE DRAWING

Referring to the drawing in detail wherein a preferred embodiment of this invention is illustrated, a conveyor system 10 is shown which will be understood to have a plurality of rollers 12 supported in parallel relation on substantially aligned horizontal axes for supporting and conveying a load such as a package, not shown, to a section of the conveyor system 10 wherein a lift assembly 14 incorporating this invention is located. If desired, a chain drive 16 may be provided to continuously drive the rollers 12 of the conveyor system 10 in the same direction to transport an article or package into position on the lift assembly 14.

The lift assembly 14 is shown having two spaced parallel pairs of arms 18, 18 and 20, 20 in perpendicular relation to one another providing a so-called "X" lift with the center portion of each of the arms being fixed to a stepped annular shoulder 22 on an upper portion of an inner cylinder 24 received in coaxial telescoping relation to an outer cylinder 26 of a fixed frame 28 for the lift 14. The outer cylinder 26 serves as a housing which not only provides bearing and guide support for the inner cylinder 24 but additionally accommodates a centrally disposed reciprocable drive 30 for the lift 14.

To provide a compact and rugged lift assembly 14 incorporating a minimum number of operating parts, the drive 30 comprises a single fluid actuated cylinder 32 received for longitudinal reciprocating movement within a tubular inner housing 34 fixed to frame 28 and concentrically disposed within its outer cylinder 26, and a piston rod 36 is operatively connected to the cylinder 32 and extends coaxially upwardly through the housing 34 to project outwardly beyond its upper end wall 38. An exposed upper end portion 40 of the piston rod 36 is shown supporting a central bearing mount 42 which has a radially projecting skirt 44 formed about its lower marginal edge for supporting an inner peripheral portion of a suitable bearing assembly 46. The bearing 46 is maintained in assembly with the central bearing mount 42 by an overlying retaining plate 48 and underlying retaining ring 50. Retaining plate 48 is coaxially fixed to the central bearing mount 42 by a machine screw 52 threadably secured to an internally threaded central opening 54 formed in the exposed upper end portion 40 of the piston rod 36. The underlying retaining ring 50 is shown concentrically mounted for rotation about the skirt 44 of the central bearing mount 42, and supports an outer peripheral portion of the bearing assembly 46. The underlying retaining ring 50 is shown fixed by fasteners 56, 56 to an overlying annular platform plate 58 which is supported on the bearing assembly 46 for rotation together with the underlying retaining ring 50 and the inner cylinder 24 which is suitably secured to the outer periphery of the lift plate 58.

Reciprocation of the piston rod 36 accordingly raises and retracts the lift 14 upon actuation of the operating cylinder 32 which will be understood to be connected to a source, not shown, of pressurized fluid such as compressed air. In this regard, the cylinder 32 may be a double acting cylinder whereby the air source can be connected in a conventional manner and selectively operated to direct compressed air to either end of housing 34 while relieving its opposite end to reciprocate the operating cylinder 32. Conventional details concerning fluid lines, couplings and controls for operating the cylinder 32 are not required for an understanding of this invention and are accordingly not illustrated. The operating cylinder 32 and its piston rod 36 not only effect vertical lifting and return of the lift 14 relative to the conveyor 10 but also will be seen to permit rotary motion to be applied to the lift 14 in a construction having a minimum number of parts.

To reorient a package supported on the lift 14 while yet utilizing only the one operating cylinder 32 and cooperating piston rod 36 as a common source of motive power and as an axis of rotation for the lift 14, the drive 30 includes an angular control operator 60 provided in accordance with this invention for applying the desired combination linear reciprocating and rotary movements to the lift 14. In the specifically illustrated embodiment of this invention, the angular control operator 60 includes a pair of cam follower rollers 62, 64 secured in diametrically opposed relation adjacent the rim 66 of the fixed outer cylinder 26 with each roller 62, 64 projecting radially inwardly to be received in a saw-tooth slot 68 circumferentially extending about the inner cylinder 24 of the lift 14 to provide a socalled barrel cam arrangement having upper and lower camming surfaces engageable with the rollers 62, 64. The lower cam track may be desirably formed by four generally V-shaped interconnecting camming surfaces 70, and the upper cam track may be provided by four separate and discrete, generally V-shaped camming surfaces 72 (FIG. 3) in overlying relation to the lower camming surfaces 70 to form four separate camming sections each of which extends about a quadrant of the inner cylinder 24. The adjacent upper end portions of the upper camming surfaces 72 are each separated by an upwardly directed vertical slot or guideway 74. Each guideway 74 is shown angularly offset, in a direction opposite the desired angular movement of the lift 14, from an apex 76 of the underlying interconnected lower camming surfaces 70. A nadir 78 of the lower camming surface 70 in each camming section is also shown offset, in a direction opposite the desired angular movement of the lift 14, relative to the nadir 80 of the overlying upper camming surface 72 in its respective camming section.

By virtue of the above described construction, when the lift 14 is in a lowered rest position with arms 18, 20 bottomed on rim 66 of cylinder 26 (as indicated by the broken lines at 82), the follower rollers 62, 64 will each be positioned adjacent the lift arms 18, 20 in an upper end portion of diametrically opposed guideways such as at 74A and 74B. Upon actuating the operating cylinder 32 to advance its piston rod 36 upwardly, the lift 14 will be thrust vertically upwardly in a nonrotating condition a sufficient distance to clear the conveyor due to the length of the guide-ways 74 and the captured movement of the follower rollers 62, 64 within their respective vertically aligned guideways 74A and 74B. Upon the lift 14 being raised to its illustrated elevated position shown in full lines in FIG. 2, the follower rollers 62, 64 will each engage leading lower camming surfaces such as at 70A and 70B (FIG. 3), and upon continued extension of the piston rod 36, the lift 14 will be rotated in a clockwise direction as viewed in FIG. 1 through an angular displacement of approximately 45° to an extended position represented by the broken lines 84 (FIG. 2) wherein rollers 62, 64 are respectively located in nadirs 78A and 78B of their camming surfaces. At that point, a suitable cylinder operating control, not shown, may be actuated to reverse fluid connections to the operating cylinder 32 to cause its piston rod 36 to retract. Such action lowers the lift 14 and the rollers 62, 64 are each moved into engagement with the upper camming surfaces 72A and 72B to continue to rotate the lift 14 in a clockwise direction through an additional angular displacement of approximately 45° before entering the following guideways 74C and 74D, respectively, upon continued retraction of the piston rod 36 into its intermediate elevated position shown in FIG. 2. With the lift 14 thus rotated 90° from its original angular position upon being retracted into its intermediate elevated position shown in full lines in FIG. 2, the lift 14 will then return to its rest position at 82 with a straight line dropping motion ensured by the receipt of the follower rollers 62, 64 in their respective guideways 74C and 74D. Suitable control means, not shown, may be desirably provided to automatically de-energize the operating cylinder 32 upon return of the lift 14 into its rest position at 82.

The cam follower rollers 62, 64 are each preferably shown in FIGS. 2 and 4 as being eccentrically mounted on an inner end of a threaded fastener 86 suitably secured by a lock nut 88 to the outer cylinder 26 of the frame 28. An indicator mark 90 is preferably formed on an enlarged outer end 92 of each fastener 86 for indicating an upper portion of its eccentrically disposed cam follower roller such as at 62 whereby rollers 62, 64 may be readily adjusted to ensure coincident engagement of each roller with the lower camming surfaces 70 on the inner cylinder 24 in the intermediate elevated position of the lift 14 to commence its rotation, as well as to ensure that the rollers 62, 64 simultaneously drop off the upper camming surfaces 72 for entry into their vertically disposed guideways 74 after the desired angular displacement of the lift 14 has been completed upon its return from extended to intermediate elevated positions.

A lift assembly 14 constructed in accordance with this invention will serve to effect a straight vertical lift to ensure clearance of the rollers 12 of the associated conveyor 10. Subsequent reciprocating movement of the lift 14 between its intermediate elevated and extended positions ensures desired rotation of the lift 14 through a predetermined angular displacement in one angular direction to reorient any article or package supported on the lift 14 relative to its conveyor 10 with the package being returned to the conveyor level as the lift 14 is dropped through a linear path of movement from its intermediate elevated position to rest position. The only power source required to effect the combination translatory and rotary motions to the lift is the single fluid motor 60. The disclosed barrel type cam provided on the inner cylinder 24 of the lift 14 for cooperation with the cam follower rollers 62, 64 of the outer cylinder 26 provides a simplified rugged lift 14 capable of dependable performance with minimum service requirements in a relatively compact assembly having few operating parts and wherein bearing guidance and control of the lift 14 is additionally effected by the outer cylinder 26 circumferentially surrounding the barrel type cam of the lift 14.

As will be apparent to persons skilled in the art, various modifications, adaptations and variations of the foregoing specific disclosure can be made without departing from the teachings of the present invention.

I claim:

1. A lift assembly for use with a conveyor and comprising a frame, a lift supported for rotation relative to the frame about a generally vertical axis and mounted for reciprocating axial movement between a rest position generally in alignment with a conveyor and an extended position in raised relation to its rest position, the lift being movable through an elevated position intermediate its rest and extended positions upon reciprocation of the lift therebetween, and drive means for reciprocating the lift between its rest and extended positions, the drive means including an angular control operator operative upon movement of the lift between its rest and intermediate elevated positions to maintain the lift in nonrotating condition, and the angular control operator being operative upon reciprocation of the lift between its intermediate elevated and extended positions for imparting progressive rotational movements in one common angular direction to the lift during its reciprocation from its intermediate elevated position toward and away from its extended position.

2. The lift assembly of claim 1 wherein the angular control operator rotates the lift a predetermined angular amount in one angular direction to cause the lift to be disposed in a rest position at a preselected angle to that initially occupied by the lift before its recirpocation by the drive means.

3. The lift assembly of claim 1 wherein the drive means includes a fluid actuated cylinder and a piston rod operated by the cylinder for reciprocating the lift between its rest and extended positions responsive to reciprocation of the piston rod by the cylinder.

4. The lift assembly of claim 3 wherein the lift is supported for rotation on the piston rod.

5. The lift assembly of claim 1 wherein the angular control operator further includes vertical guideway means on one of the lift and frame members, and a projection on the other of the lift and frame members, the projection being received in the vertical guideway means upon movement of the lift between its rest and intermediate elevated positions for maintaining the lift in a nonrotating condition.

6. A lift assembly for use with a conveyor and comprising a frame, a lift supported for rotation relative to the frame about a generally vertical axis and mounted for reciprocating axial movement between a rest position generally in alignment with a conveyor and an extended position in raised relation to its rest position, the lift being movable through an elevated position intermediate its rest and extended positions upon reciprocation of the lift therebetween, and drive means for reciprocating the lift between its rest and extended positions, the drive means including an angular control operator operative upon movement of the lift between its rest and intermediate elevated positions to maintain the lift in nonrotating condition, and the angular control operator being operative upon reciprocation of the lift between its intermediate elevated and extended positions for imparting rotational movement to the lift, the angular control operator comprising a disengageable positive one-way rotary drive operable to be drivingly engaged with the lift in its intermediate elevated position for rotating the lift a predetermined angular amount in one angular direction and to be disengaged after the lift has rotated said predetermined angular amount.

7. The lift assembly of claim 6 wherein the rotary drive is disengaged responsive to return of the lift into its intermediate elevated position.

8. A lift assembly for use with a conveyor and comprising a frame, a lift supported for rotation relative to the frame about a generally vertical axis and mounted for reciprocating axial movement between a rest position generally in alignment with a conveyor and an extended position in raised relation to its rest position, the lift being movable through an elevated position intermediate its rest and extended positions upon reciprocation of the lift therebetween, and drive means for reciprocating the lift between its rest and extended positions, the drive means including an angular control operator operative upon movement of the lift between its rest and intermediate elevated positions to maintain the lift in nonrotating condition, and the angular control operator being operative upon reciprocation of the lift between its intermediate elevated and extended positions for imparting rotational movement to the lift, the angular control operator including a cam on one of the lift and frame members, and a cam follower on the other of the lift and frame members, the follower engaging the cam when the lift is raised to said intermediate elevated position, the follower and cam cooperating to rotate the lift a predetermined angular amount in one angular direction from a first angular condition to a second angular condition during vertical reciprocation of the lift between its intermediate elevated and extended positions, the follower disengaging the cam upon return of the lift to its intermediate elevated position and permitting linear nonrotating return of the lift therefrom vertically downwardly into its rest position with the lift being angularly oriented in its second angular condition.

9. The lift assembly of claim 8 further including releasable fastening means for securing the cam follower in adjusted position on said other of the lift and frame members, the cam follower being eccentrically mounted relative to its fastening means for selectively adjusting engagement of the cam follower with the cam in said intermediate elevated position of the lift.

10. A lift assembly for use with a conveyor and comprising a frame, a lift supported for rotation relative to the frame about a generally vertical axis and mounted for reciprocating axial movement between a rest position generally in alignment with a conveyor and an extended position in raised relation to its rest position, the lift being movable through an elevated position intermediate its rest and extended positions upon reciprocation of the lift therebetween, and drive means for reciprocating the lift between its rest and extended positions, the drive means including an angular control operator operative upon movement of the lift between its rest and intermediate elevated positions to maintain the lift in nonrotating condition, and the angular control operator being operative upon reciprocation of the lift between its intermediate elevated and extended positions for imparting rotational movement to the lift, the angular control operator rotating the lift a predetermined angular amount in one angular direction to cause the lift to be disposed in a rest position at a preselected angle to that initially occupied by the lift before its reciprocation by the drive means, said predetermined angular amount of rotation of said lift being a 90° angular displacement responsive to reciprocating movement of the lift from its intermediate elevated position toward and away from its extended position.

11. A lift assembly for use with a conveyor and comprising a frame, a lift supported for rotation relative to the frame about a generally vertical axis and mounted for reciprocating axial movement between a rest position generally in alignment with a conveyor and an extended position in raised relation to its rest position, the lift being movable through an elevated position intermediate its rest and extended positions upon reciprocation of the lift therebetween, and drive means for reciprocating the lift between its rest and extended positions, the drive means including an angular control operator operative upon movement of the lift between its rest and intermediate elevated positions to maintain the lift in nonrotating condition, and the angular control operator being operative upon reciprocation of the lift between its intermediate elevated and extended positions for imparting rotational movement to the lift, and wherein first and second coaxial telescoping cylinders are provided on the frame and lift members, wherein a cam track is formed on one of the cylinders, and wherein a cam follower means is formed on the other of the cylinders, the cam track and cam follower means being operative upon reciprocation of the lift between its intermediate elevated and extended positions for rotating the lift a predetermined angular amount in one angular direction responsive to reciprocation of the lift between said intermediate elevated and extended positions.

12. The life assembly of claim 11 whereing the cam track formed on said one cylinder is provided by a saw-tooth slot circumferentially extending about said one cylinder to provide upper and lower camming surfaces engageable with the cam follower means for imparting said rotational movement to the lift.

13. The lift assembly of claim 12 wherein the saw-tooth slot is configured and dimensioned to provide a 90° angular displacement of the lift during one operating cycle of the angular control operator upon reciprocation of the lift from its intermediate elevated position toward and away from its extended position.

14. The lift assembly of claim 12 wherein the cam follower means comprises a pair of cam follower rollers mounted on said other cylinder in diametrically opposed relation thereon for receipt in the saw-tooth slot of said one cylinder.

* * * * *